July 12, 1938.  R. L. McFARLAN ET AL  2,123,573
APPARATUS FOR MEASURING THE CONCENTRATION OF VITAMIN A
Filed July 27, 1936   2 Sheets-Sheet 1
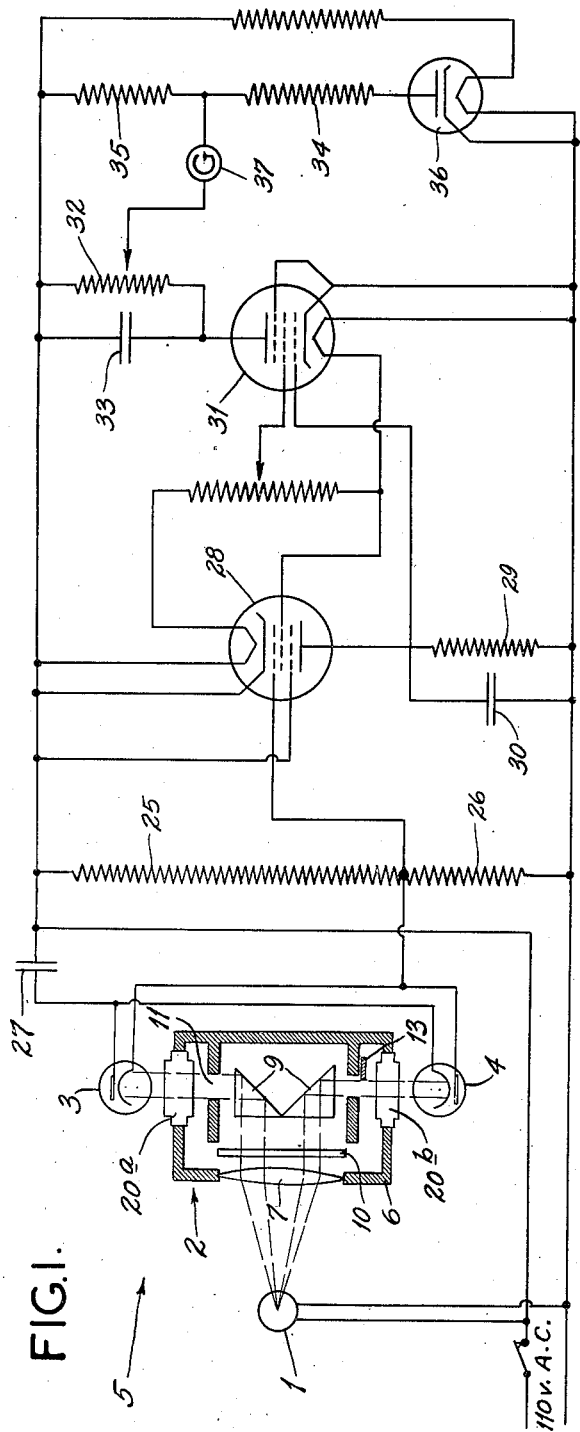
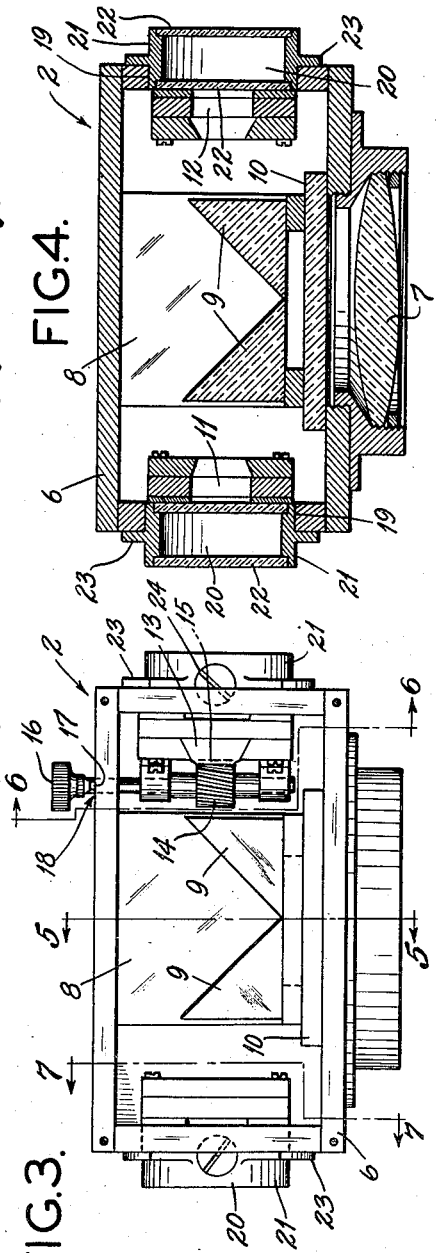
Ronald Lyman McFarlan,
James Wallace Reddie,
Inventors,
Delos G. Haynes,
Attorney.

July 12, 1938. R. L. McFARLAN ET AL 2,123,573
APPARATUS FOR MEASURING THE CONCENTRATION OF VITAMIN A
Filed July 27, 1936 2 Sheets-Sheet 2
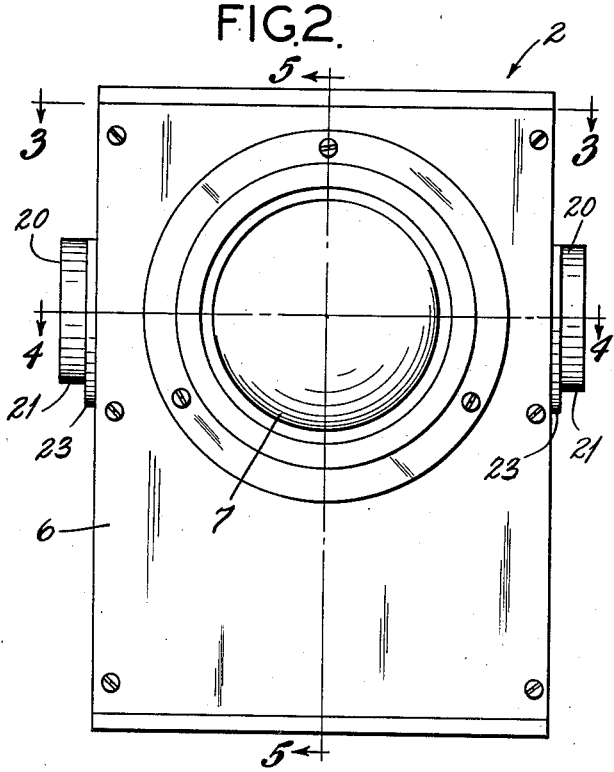
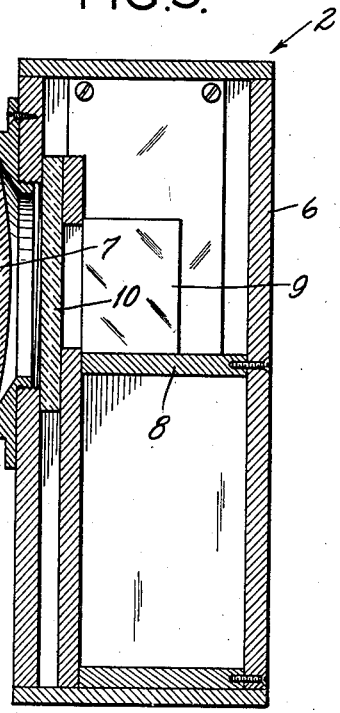
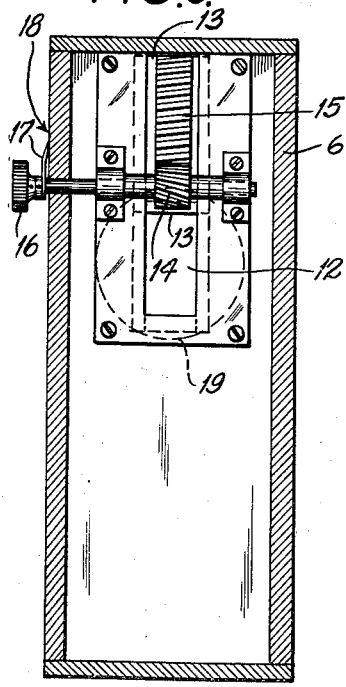
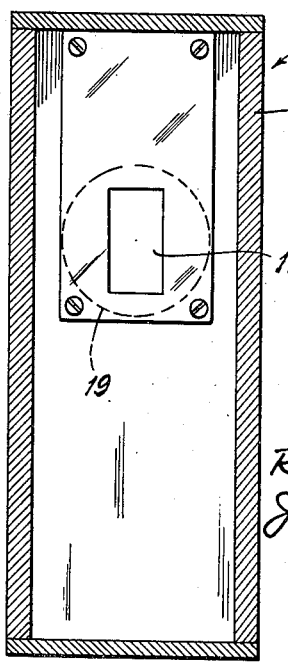
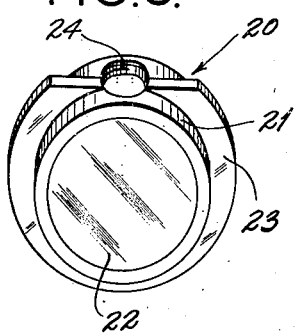
Ronald Lyman McFarlan,
James Wallace Reddie,
Inventors,
Delos F. Haynes,
Attorney.

Patented July 12, 1938

2,123,573

UNITED STATES PATENT OFFICE 2,123,573

APPARATUS FOR MEASURING THE CONCENTRATION OF VITAMIN A

Ronald Lyman McFarlan, Marblehead Neck, and James Wallace Reddie, Hull, Mass., assignors to United Drug Company, Boston, Mass., a corporation of Delaware Application July 27, 1936, Serial No. 92,940

3 Claims. (Cl. 88—14)

This invention relates to apparatus for measuring, and with regard to certain more specific features, to apparatus for measuring the concentration of vitamin A.

Among the several objects of the invention may be noted the provision of apparatus for measuring of the class described, which involves a measurement of the extent of absorption by a given sample of light rays of a selected wave length, the extent of absorption of such light rays being a determinable function of the concentration of the vitamin A containing substance composing the sample; apparatus of the class described which is almost entirely free from the possibility of human error; apparatus of the class described wherein an expression of a result is obtained in terms of the proportion of light absorbed in a given sample as compared to the light absorbed in a reference sample of known, or at least disregardable, absorption; apparatus of the class described wherein a measurement is made by balancing a sample against a reference sample using the principles of photoelectricity; the provision of apparatus in which there is provided means for compensating errors arising from the comparison of a sample and a reference sample, and in which manually operable means are provided for adjusting the amount of light transmitted by the reference sample, until said amount of light equals the amount of light transmitted by the sample under determination; apparatus of the class described in which a common light source is provided for both samples, and the amount of light directed from the common source towards each sample is equal; apparatus of the class described embodying means for regulating the wave length of the light reaching the samples to an optimum value for such samples; apparatus of the class described which includes a photoelectric circuit for light-balancing purposes, which circuit is conveniently operable for the desired purposes; and apparatus of the class described which is constructed for easy manipulation and operation in the taking of measurements. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic showing of apparatus embodying the present invention, including an electrical circuit therefor;

Fig. 2 is a front elevation of a measuring box embodying the present invention;

Fig. 3 is a plan view with the cover removed taken on the line 3—3 of Fig. 2;

Fig. 4 is a horizontal section taken substantially on line 4—4 of Fig. 2;

Figures 5, 6 and 7 are vertical sections taken substantially on lines 5—5, 6—6 and 7—7, respectively, of Fig. 3; and Fig. 8 is a perspective view of an absorption cell.

Similar reference characters indicate corresponding parts throughout the several views of the drawings.

It has heretofore been established that the degree of absorption of a range of substances for light of wave lengths peculiarly correlated to the substance, is dependent upon, or determinative of, properties of the substance such as its concentration. Thus the absorption of such a substance to its correlated wave length of light affords a convenient measure of such factors as concentration. This fact affords a particularly convenient means of measuring the concentration, for example, of chemically highly complex substances such as the vitamins, which cannot readily be determined by ordinary analytical chemical methods, and which is difficult and costly to determine by biological methods.

The so-called vitamin A, for example, has been determined to have such an absorption for light of wave lengths in the region of 3,280 Ångström units, that such absorption is a measure of the vitamin A concentration. The theoretical aspects of this correlation are described at length on pages 17 to 40 of a book by R. A. Morton, entitled "The Application of Absorption Spectra to the Study of Vitamins and Hormones", published by Adam Hilger, Ltd., 98 Kings Road, Camden Road, London, N. W. 1, England, to which reference is directed.

The present invention has been designed primarily to measure the concentration of substances, such as oils, containing vitamin A, by their absorption towards light of a selected wave length.

Basically, the apparatus of the present invention comprises a light source 1 (see Fig. 1), a comparison absorption meter 2, photoelectric cells 3 and 4, and an electrical circuit indicated generally by numeral 5, which includes the cells 3 and 4.

The light source 1 preferably comprises, for vitamin A measurements, a sodium vapor lamp, because the spectrum of sodium vapor light shows a line of high intensity at a wave length of 3,303 Ångström units, which is quite close to the established value of 3,280 Ångström units for vitamin A.

The absorption meter 2 comprises a particular feature of the present invention. A satisfactory construction therefor is shown in Figures 2 through 7, while Fig. 1 shows, diagrammatically, the primary parts thereof.

Numeral 6 indicates a box or enclosure, having front, back, sides, top, and bottom. In the center of the front of the box 6 is positioned a lens 7, which is mounted in line with the lamp 1 and at its focal distance from the lamp 1. For the wave lengths of light employed to measure the concentration of vitamin A, the lens 7 should preferably be made of quartz. Inside the box 6, and positioned on the optical axis of the lens 7, are mounted (as on a shelf 8) a pair of light-reflecting prisms 9, which are likewise preferably made of quartz. The prisms 9 are preferably of the totally reflecting type, and are positioned so that the parallel light rays coming from the lens 7 are split into two beams directed oppositely to each other, one against the right-hand side of the box 6, and the other against the left-hand side.

Between the lens 7 and the prisms 9 is mounted a filter 10, which may be of any suitable kind. For vitamin A determination, the filter 10 may advantageously be one made by the Corning Glass Works and designated as "red-purple Corex No. 986", as this filter has a high transmissibility in the region of 3,300 Ångström units, and effectively filters out most of the light of other wave lengths coming from a sodium vapor lamp.

In one end of the box 6 there is provided a rectangular opening or slot 11 of known area. In the other end of the box there is provided a rectangular opening or slot 12, which has a vertically sliding shutter or mask 13 actuated by a pinion 14 engaging a rack 15 on the slide 13. The pinion 14 is in turn actuated by a knob 16 available for manipulation on the back of the box 6. The knob 16 carries a pointer 17, which follows a scale 18 on the box. The indicia of the scale 18 are such as to show the position of the slide 13, and hence the proportion of the slot 12 that is open. In its full open position, the slot 12 has exactly the same area as the slot 11. The slide 13 may be moved so as to close the slot 12 completely.

In the ends of the box 6, outside the slots 11 and 12, there are provided circular openings 19 for receiving absorption cells 20 shown more particularly in Fig. 8. Each absorption cell 20 comprises a cylinder 21, usually of metal, provided with a transparent window or wall 22 on each side thereof. For vitamin A measurement, the windows 22 should preferably be quartz. Extending outwardly from the periphery of the cylinder 21 is a flange 23. The upper edge of the flange 23 is ordinarily cut away in the manner shown, and a threaded opening 24 provided for filling the cylinder with the fluid to be examined. A plug (not shown) is usually screwed into the opening 24 in order to prevent evaporation of the sample. While the absorption cells 20 are mechanically identical for each end of the meter, they are, in operation, filled with different liquids; hence, for convenience, the cell 20 placed in front of the fixed-area slot 11 will hereinafter be designated as "20a", while the cell 20 placed in front of the variable-area slot 12 will be designated as "20b." It is important that the thickness of the fluid in the absorption cells 20a and 20b, between the windows 22 on each side thereof, be the same.

The photoelectric cells 3 and 4 are chosen to have as nearly identical response characteristics as possible. We have found the General Electric Company's type "PJ-23" cells to be particularly satisfactory, because their response is high to light of a wave length of 3,300 Ångström units, as here used. The cells 3 and 4 are mounted outside the absorption meter 2 in such manner that one photoelectric cell 3 faces the absorption cell 20a, while the other photoelectric cell 4 faces the absorption cell 20b. Since the light rays coming from the prisms 9 are parallel, there is no necessity that the photoelectric cells 3 and 4 be located at identical distances from the absorption cells 20a and 20b, in order to produce identical responses from identical amounts of light reaching them.

The electrical circuit 5 shown is based upon a circuit elsewhere described (see, for example, the journal "Electronics" for September, 1935, page 38, diagram A), with the constants of the circuit altered to fit the circumstances herein involved and with a different method of measuring the final output current. Hence only the general features of the circuit 5 will be described herein.

The potential across the two photoelectric cells 3 and 4 is obtained from a potential divider, which comprises (Fig. 1) a 400,000 ohm resistance 25 and a 100,000 ohm resistance 26. The cells 3 and 4 are connected to one side of a 100 m. m. f. condenser 27. The cells are connected so that one will charge the condenser 27 during one-half of a cycle, while the current through the other cell will discharge the condenser 27. The resultant charge of the condenser is impressed on the control grid of a type 6C6 vacuum tube 28. The current through this tube 28 is thus determined by the relative currents through the two photoelectric cells.

The plate current through the tube 28 passes through a 10,000 ohm resistance 29, which is by-passed by a 1 m. f. condenser 30. This condenser 30 charges during one-half of a cycle, and partially discharges during the next half of the cycle. The potential on this condenser 30 is determined by the plate current through the tube 28. The potential on this condenser 30 is impressed on the control grid of a type 43 tube 31. The tube 31 passes current during the half cycle during which the tube 28 is not passing current. Thus, the discharge of the condenser 30 is used to control the current through the tube 31. Consequently, the current through the tube 31 is determined by the potential on the condenser 30, which is in turn determined by the potential on the condenser 27.

The current through the tube 31 passes through a 2,000 ohm resistance 32, which is by-passed by a 4 m. f. condenser 33. Part of the potential drop through the resistance 32 is bucked against the potential drop across a 1,000 ohm resistance 34 and a 600 ohm resistance 35, connected in series with a type 12Z3 rectifier tube 36. The circuit is balanced (for example, for unequal response characteristics in the photoelectric cells 3 and 4) by picking off any desired amount of potential drop across the resistance 32 and bucking it against the potential drop across the resistance 35. When the circuit is thus balanced, any change in the light intensity falling on either photoelectric cell will be reflected in a changed potential drop across the resistance 32, which is indicated by the deflection from its zero position of a galvanometer 37.

It is to be understood that the values given above, and the tube-types, are by way of example only. It is important that the line voltage supplying the amplifier be as constant as possible.

The apparatus as thus described is used to measure vitamin A concentration in the following manner:

The oil to be measured is first made up into a suitable solution in a suitable solvent. We have found it convenient to dissolve the oil in cyclohexane, using convenient concentrations.

The absorption cell 20a is now filled carefully with the oil solution, while the other absorption cell 20b is filled with the pure solvent. In this manner the absorption of the solvent automatically cancels itself out in the subsequent measurement, and can thus be disregarded. The absorption by and reflection from the quartz windows 22, being equal on both sides, likewise cancels out.

The filled absorption cell 20a is now placed in the box before the fixed area slot 11, and the filled absorption cell 20b is placed before the variable area slot 12, and the lamp 1 is illuminated and the electrical circuit connected. The slot 12 is presumed to be in fully opened position. Because of the different absorption of the cell 20a filled with the sample being examined, less light will reach the photoelectric cell 3 than reaches the photoelectric cell 4, depending upon the extent of absorption of the light by the sample. If, now, the slide 13 is moved by turning the knob 16, thereby decreasing the effective area of the slot 12, the amount of light reaching the photoelectric cell 4 can be diminished until it exactly equals the amount of light reaching the cell 3, which is determined by the return of the needle of galvanometer 37 to its zero position, the circuit having been previously balanced so that the galvanometer 37 reads zero with both absorption cells removed from the meter.

If the scale 18 is made to read in terms of the natural logarithm of the ratio of the areas of the two slots 11 and 12, then this value, designated as E, is the absorption coefficient of the sample oil being measured. If the thickness of the liquid in the absorption cells is 1 cm., and the concentration of the oil in the solvent is 1%, then the E value is stated as $$E_{1cm}^{1\%}$$

and, with the light employed, the vitamin content of the oil in International Units of Vitamin A per gram of oil may be obtained simply by multiplying the E value by the factor 1,600. This factor is given in the Quarterly Bulletin of the Health Organization of the League of Nations, Vol. III, No. 3, for September, 1934.

If the solution is at a concentration of P%, instead of 1%, then the scale reading must be multiplied by P in addition to being multiplied by the factor 1,600, in order to obtain the vitamin A content in the said International Units.

The percentage concentration of the vitamin A present in the sample may also be determined from the scale reading, by dividing the scale reading by 16 times the percentage concentration of the sample in the solvent.

With the simple relations as above set forth, it will be seen that the scale 18 may readily be calibrated to read directly in either International Units or in percentage concentration, providing a standard concentration of sample in solvent is adopted for all samples.

The meter can also be calibrated against samples of known vitamin A concentration, and these concentrations plotted on the scale for reference in the examination of samples of unknown vitamin A concentration.

The apparatus of the present invention may readily be used to measure the properties of other substances than vitamin A, by changing, for example, the light source 1, the filter 10, and possibly also the photoelectric cells 3 and 4 from the specific type stated to cells more suited to the new wave length of light employed.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. Apparatus for measuring the concentration of vitamin A in a substance comprising a sodium vapor light source, means filtering substantially all light except that at a wave length of the order of 3,300 Ångström units from the light from said source, means defining two beams of filtered light of substantially equal intensity from said source, photosensitive devices upon which said beams are directed, means confining the areas of the said beams to substantially identical values, means for interposing a sample of the substance in one of the beams, and means for decreasing the area of the other beam.

2. Apparatus for measuring the relative absorption of a substance including a substantially light-tight box, a lens positioned in an opening at the front of said box, prisms in said box behind said lens splitting the light from said lens into two beams directed at the opposite lateral sides of the box, the said sides of the box having openings, absorption cells in said openings, each of said lateral sides having means thereon providing a slot, the two slots thus provided being of substantially equal area, and both slots being positioned in the respective light paths between the prisms and the said absorption cells, and means for varying the area of one of said slots.

3. Apparatus for measuring the concentration of vitamin A in a substance, comprising a sodium vapor light source, means defining two beams of light of substantially equal intensity from said source, photosensitive devices upon which said beams are directed, means confining the areas of said beams to substantially identical values, means for interposing a sample of the substance in one of the beams, means for decreasing the area of the other beam; and means limiting the portion of said beams effective upon said photosensitive devices, to light of a wave length of the order of 3,300 Ångström units.

RONALD LYMAN McFARLAN.
JAMES WALLACE REDDIE.